US011924172B1

(12) United States Patent
Olofsson et al.

(10) Patent No.: US 11,924,172 B1
(45) Date of Patent: Mar. 5, 2024

(54) SYSTEM AND METHOD FOR INSTANTIATION OF STATELESS EXTRANETS

(71) Applicant: GRAPHIANT, INC., Fremont, CA (US)

(72) Inventors: Stefan Olofsson, Dubai (AE); Neale Ranns, Hure (FR); Mandeep Rohilla, London (GB); IJsbrand Wijnands, Leuven (BE); Cameron Ferdinands, Queensland (AU)

(73) Assignee: GRAPHIANT, INC., Fremont, CA (US)

( * ) Notice: Subject to any disclaimer, the term of this patent is extended or adjusted under 35 U.S.C. 154(b) by 308 days.

(21) Appl. No.: 17/512,589

(22) Filed: Oct. 27, 2021

(51) Int. Cl.
*H04L 9/40* (2022.01)
*H04L 61/256* (2022.01)

(52) U.S. Cl.
CPC .......... *H04L 63/029* (2013.01); *H04L 61/256* (2013.01); *H04L 63/0272* (2013.01); *H04L 63/164* (2013.01)

(58) Field of Classification Search
CPC . H04L 63/029; H04L 63/0272; H04L 63/164; H04L 61/256
See application file for complete search history.

(56) References Cited

U.S. PATENT DOCUMENTS

| 9,420,336 | B1* | 8/2016 | Woodhead | H04N 21/4524 |
| 10,848,473 | B1* | 11/2020 | James | H04L 9/0894 |
| 11,271,807 | B1* | 3/2022 | Rothschild | H04L 41/0895 |
| 2018/0034698 | A1* | 2/2018 | Perez | H04L 41/0886 |
| 2021/0306273 | A1* | 9/2021 | Wright | H04L 47/20 |

* cited by examiner

*Primary Examiner* — Hee K Song
(74) *Attorney, Agent, or Firm* — Maschoff Brennan (57) ABSTRACT

Methods for establishing a stateless extranet in a secure communication network include transmitting a consumer NHOP to a provider CPE from a consumer CPE in a control plane. The consumer NHOP is associated with at least one attribute of an NHOP, including an encryption key available with the consumer CPE, to establish a secure communication tunnel in a data plane. The consumer CPE receives a service definition over the control plane associated with a service available with the provider CPE. A service anchor point is created based on an identifier of the service definition. A network address translation (NAT) IP request is transmitted to the provider CPE. The consumer CPE receives a NAT IP from the provider CPE in response to the NAT IP request. The NAT IP is associated with the service anchor point of the consumer CPE. A stateless service is thereby instantiated on the consumer CPE.

20 Claims, 6 Drawing Sheets

SYSTEM AND METHOD FOR INSTANTIATION OF STATELESS EXTRANETS

FIELD OF THE INVENTION

The embodiments discussed in the present disclosure are generally related to providing instantiation of stateless extranets. In particular, the embodiments discussed are related to provide establishing stateless extranets in networks between consumers and providers.

BACKGROUND OF THE INVENTION

Creation of extranets occurs through leakage of routing information between existing networks such as through virtual private network (VPN) that extends a private network across a public network. The VPN enables users to send and receive data across shared or public networks using virtual routing and forwarding (VRF) that allows multiple instances of a routing table to co-exist within the same router at the same time instance. A lot of routing information must be stored on the devices involved in the extranet construction, which opens security attack vectors. Traditional extranets are typically static constructs with fixed memberships for routing domains and/or devices. A restriction, to permanently exchange and store routing information, hinders the possibility of dynamic, short-lived memberships for specific projects or for specific customer goals.

Multiprotocol label switching (MPLS) provides extranet capabilities that involve keeping routing tables for all participating sites that are static in nature and that expose participant sites completely from a routing perspective. Software-defined wide area networks (SD-WANs) often refer to themselves as providing an extranet function, and the term is used broadly. Depending on the technology being used, the kind of extranets provided by each platform can vary dramatically.

Therefore, there is a need for providing a more secure, reliable, and computationally less expensive mechanism for secure communication in a network.

SUMMARY OF THE INVENTION

Embodiments of a stateless extranet and a corresponding method are disclosed that address at least some of the above challenges and issues.

In accordance with the embodiments of this disclosure, a method implemented in a provider customer premises equipment (CPE) for secure network communication is presented. The provider CPE may, therefore, transmit a provider NHOP, from the provider CPE to a consumer CPE in a control plane. The provider NHOP is associated with at least one attribute of an NHOP. The at least one attribute of the NHOP is associated with an encryption key, available with the provider CPE, to establish a secure communication tunnel in a data plane, from the provider CPE to the consumer CPE. The provider CPE may further transmit a service definition, from the provider CPE to the consumer CPE as a control plane information over the control plane. The service definition is associated with a service, available with the provider CPE. The provider CPE may further receive a network address translation (NAT) IP request, from the consumer CPE and assign a network address translation (NAT) IP, to the consumer CPE, using at least one identifier of the service definition. The NAT IP is associated with a service anchor point, of the consumer CPE and a stateless service is instantiated on the consumer CPE using the NAT IP.

In accordance with the embodiments of this disclosure, a method implemented in a consumer customer premises equipment (CPE) for secure network communication is presented. The consumer CPE may, therefore, transmit a consumer NHOP, to the provider CPE from the consumer CPE in the control plane. The consumer NHOP is associated with at least one attribute of an NHOP. The at least one attribute of the NHOP is associated with an encryption key, available with the consumer CPE, to establish the secure communication tunnel in the data plane, from the consumer CPE to the provider CPE. The consumer CPE may further receive the service definition as a control plane information over the control plane, from the provider CPE. The service definition is associated with a service, available with the provider CPE. The consumer CPE may further create a service anchor point based on at least one identifier of the service definition and transmit the network address translation (NAT) IP request in response to creation of the service anchor point, to the provider CPE. The consumer CPE may further receive the network address translation (NAT) IP using the at least one identifier of the service definition, from the provider CPE. The NAT IP is associated with the service anchor point, of the consumer CPE. A stateless service is instantiated on the consumer CPE using the NAT IP.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Various such enterprise networks located at different sites may need to be connected to each other via a core network for external communication. Therefore, an enterprise network may include one or more internal networks that are located at geographically separate sites.

The "core network" may refer to a network infrastructure that may provide services to connect one or more enterprise networks with each other. The core network represents a central or core element that provides one or more routing paths for exchange of information between different enterprise networks. The core network may facilitate high-capacity communication between different enterprise networks located at different geographical locations.

A "controller" for controlling and managing communication among network entities or nodes in a network. The controller may be a dedicated controller for a particular enterprise (e.g., controller A for enterprise A, controller B for enterprise B etc.). For instance, controller X may be a centralized managing node that may be owned and operated by enterprise A to manage communication between enterprise nodes or CPEs owned and operated by enterprise A. Alternatively, controller X may be a multi-tenant controller for multiple tenants, customers, or enterprises. The multi-tenant controller may include logical segmentation for different customers and thus, segmentation may be maintained across different customers.

A "core node" may refer to any node within the core network, which is capable of routing data packets to another core node within the core network. The core node may include, but not limited to an access point, a router, a bridge, a server, a gateway, a switch, a modem, a relay, or a hub.

A "service provider" (SP) may refer to an entity providing, managing, and/or operating the core network, over which data is routed to and/or from one or more enterprise customers. The disclosed architecture provides a method for the SPs to provide connectivity services to the one or more enterprise customers over the core network, which is a shared core infrastructure. Non-limiting examples of SPs may include Secure Access Service Edge (SASE) providers, Network as a Service (NaaS) providers, Multiprotocol Label Switching (MPLS) Virtual Private Network (VPN) providers, and Software Defined Wide Area Network (SD-WAN) providers.

A "customer premises equipment" (CPE) is located within the premises of the enterprise networks. The CPEs may include, but not limited to, gateways, switches, routers, network adapters, and so on. The CPE may receive data packet(s) originated from an endpoint device and perform encryption and/or encapsulation on the received data packets to create encrypted and/or encapsulated data packet(s). The CPE may transmit the encrypted and/or encapsulated data packet(s) towards a second CPE via the core network. The second CPE may receive the encrypted and/or encapsulated data packet(s) from the core network and transmit these data packet(s) to an intended destination node. Alternatively, as per function, the CPE may be called a provider CPE or a consumer CPE. The provider CPE may transmit the data packet to the consumer CPE. The consumer CPE may receive the data packet from the provider CPE. The provider CPE may offer to connect one or more services of one or more service providers to one or more consumer CPEs in the enterprise network.

In this disclosure, "CPE-Ax" refers to CPEs of a customer enterprise A. For example, CPE-A1, CPE-A2, and CPE-An refer to CPEs for a customer enterprise A. Similarly, for a different customer B, the CPEs may be denoted by "CPE-Bx" and so on.

An "endpoint device" or a client may be any device associated with customers, individuals, or end users. The endpoint device may be a source node and/or a destination node to transmit and/or receive data packets from customer premises equipment (CPEs) via the core network. The endpoint device may include, but is not limited to, a computer, a personal digital assistant (PDA), a laptop, a cellular telephone, a tablet, or any other device or network element capable of initiating or exchanging data within one or more communication networks.

Furthermore, a "data packet" refers to data or information that is packaged for transmission over a network. The data packet created by the source node may include a payload portion, a metadata portion, and one or more headers. The headers may include one or more of, but not limited to, an inner internet protocol (IP) header and an outer IP header. The payload portion may include data (e.g., customer related data) that the source node of an enterprise network may intend to transmit to the destination node of the enterprise network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

A "service anchor point" may refer to an instantiation of a routing domain on the consumer CPE specifically created for the service being consumed. The routing domain can be implemented using VRF and includes a virtual interface (such as a loopback) that hosts the IP-address used by the consumer for the specific service in question. This is independent of the IP-address being private or public in nature. By using the service anchor point, it is possible for the consumer CPE to be a consumer of multiple services. The multiple services can be consumed without having to worry about determining whether public or private IP addresses used by consumers may overlap.

An "NHOP" may refer to a data structure shared between members/participants in a control plane domain, regardless of them being inline or off-path, that describes the nature of each attached interface on the CPEs in the network. The NHOP includes attributes such as, but not limited to, the IP-address or an underlay interface, a public portion of the encryption key used to communicate for another NHOP, device identity, load-balancing information, core network attachment, etc. The CPE receiving the NHOP from another CPE will be equipped with all the information required to communicate with any remotely located CPE, given that the remotely located CPE has received an updated NHOP from a local CPE. The NHOP as a control plane information is exchanged prior to a data plane communication. The NHOP offers another route in a routing table and works like a recursive look up. The NHOP may also act as a pointer to a next hop data structure, the pointer is a prefix stored in the routing table. The NHOP is a logical end point that is represented by the remotely located CPE and every CPE has a unique NHOP, always shared during the control plane communication.

A "control plane" is a virtual communication layer between CPEs for exchanging control plane information via a controller. The controller can be in-band or off-path controller. In case of in-band, the core network allows for control plane communication.

A "data plane" connection is an outcome of the control plane information exchanges between CPEs. In addition, the core nodes operate only an in-band data plane to construct the core portion of the data plane, but both the control plane and the data plane are present and operational within the core domain. Foundational data plane elements do not actually enable routing but enables a virtual connection between the devices (such as a provider CPE and a consumer CPE) and there is no need to exchange additional routing information.

An "IP pool" may refer to a set of IP addresses that are available, via a service definition, at the provider CPE for consumption by the consumer CPE. The consumer CPE can utilize the service by sending traffic to the provider CPE using an IP address from the IP pool that is available in the service definition. For the provider CPE to be independent of the network structure of the consumer CPE, a network address translation (NAT) IP is used on the consumer CPE and provided by the provider CPE. The NAT IP ensures that the address presented to the provider CPE (during a service session) is always unique and is the address assigned by the provider CPE to the specific consumer CPE. The NAT IP allows the service to be reached using the IP address from the IP pool that is free or available in the network and eliminates any potential IP address conflict.

For secure communication of data packets through a network, various "encapsulation" techniques defined by the IPsec standard, may be implemented to encapsulate the data packets. For instance, the deployed encapsulation techniques may include, but not limited to, security payloads, such as a first encapsulation, a second encapsulation. To further enhance the security of the data packet, one or more "encryption" techniques may also be implemented. For instance, encryption techniques such as, but not limited to, first or second encryption, advanced encryption standard (AES)-based encryption, data encryption standard (DES)-based encryption, and Triple-DES based encryption may be implemented to encrypt the data packet. One or more of these techniques may be implemented, either individually or in combination with each other, without departing from the scope of the ongoing description.

Embodiments of a provider customer premises equipment (CPE) in an enterprise network for secure network communication are disclosed, in accordance with the embodiments of this disclosure, the provider CPE may include a processor and a memory storing computer-executable instructions that when executed, cause the processor to transmit a provider NHOP from the provider CPE to a consumer CPE in a control plane. The provider NHOP is associated with at least one attribute of an NHOP, the at least one attribute of the NHOP is associated with an encryption key available with the provider CPE to establish a secure communication tunnel in a data plane from the provider CPE to the consumer CPE. The computer-executable instructions further cause the processor to transmit a service definition as a control plane information over the control plane from the provider CPE to the consumer CPE, the service definition is associated with a service available with the provider CPE. The computer-executable instructions further cause the processor to receive a network address translation (NAT) IP request from the consumer CPE and assign a network address translation (NAT) IP in response to the NAT IP request to the consumer CPE using at least one identifier of the service definition. The NAT IP is associated with a service anchor point of the consumer CPE and a stateless service is instantiated on the consumer CPE using the NAT IP.

In the above-described embodiments, the computer-executable instructions further cause the processor to receive a consumer NHOP from the consumer CPE. The consumer NHOP is associated with at least one attribute of the NHOP. The at least one attribute of the NHOP is associated with an encryption key available with the consumer CPE to establish the secure communication tunnel in the data plane from the consumer CPE to the provider CPE.

In an embodiment, a provider customer premises equipment (CPE) implements a technique for secure network communication. The provider CPE may, therefore, transmit a provider NHOP, from the provider CPE to a consumer CPE in the control plane. The provider NHOP is associated with at least one attribute of an NHOP, the at least one attribute of the NHOP is associated with an encryption key, available with the provider CPE, to establish a secure communication tunnel in a data plane, from the provider CPE to the consumer CPE. The provider CPE may further transmit a service definition as a control plane information over the control plane, from the provider CPE to the consumer CPE, the service definition is associated with a service, available with the provider CPE. The provider CPE may further receive a network address translation (NAT) IP request, from the consumer CPE and assign a network address translation (NAT) IP in response to the NAT IP request, to the consumer CPE, using at least one identifier of the service definition. The NAT IP is associated with a service anchor point, of the consumer CPE and a stateless service is instantiated, on the consumer CPE, using the NAT IP.

In accordance with the embodiments of this disclosure, a consumer customer premises equipment (CPE) in an enterprise network for secure network communication is presented. In an embodiment, the consumer CPE may include a processor and a memory storing computer-executable instructions that when executed, cause the processor to transmit a consumer NHOP to a provider CPE in a control plane. The consumer NHOP is associated with at least one attribute of an NHOP. The at least one attribute of the NHOP is associated with an encryption key available with the consumer CPE to establish a secure communication tunnel in a data plane from the consumer CPE to the provider CPE. The computer-executable instructions further cause the processor to receive a service definition as a control plane information over the control plane from the provider CPE, the service definition is associated with a service available with the provider CPE. The computer-executable instructions further cause the processor to create a service anchor point based on at least one identifier of the service definition.

The computer-executable instructions further cause the processor to transmit a network address translation (NAT) IP request to the provider CPE in response to creation of the service anchor point and receive a network address translation (NAT) IP in response to the NAT IP request from the provider CPE using the at least one identifier of the service definition. The NAT IP is associated with the service anchor point of the consumer CPE. A stateless service is instantiated on the consumer CPE using the NAT IP.

In the above-described embodiments, the computer-executable instructions further cause the processor to receive a provider NHOP from the provider CPE to the consumer CPE. The provider NHOP is associated with at least one attribute of the NHOP. The at least one attribute of the NHOP available with the provider CPE is associated with an encryption key to establish the secure communication tunnel in the data plane to the consumer CPE from the provider CPE.

In an embodiment, a consumer customer premises equipment (CPE) implements a technique for secure network communication. The consumer CPE may, therefore, transmit a consumer NHOP, to a provider CPE from the consumer CPE in a control plane. The consumer NHOP is associated with at least one attribute of an NHOP. The at least one attribute of the NHOP is associated with an encryption key, available with the consumer CPE, to establish a secure communication tunnel in a data plane, from the consumer CPE to the provider CPE. The consumer CPE may further receive a service definition as a control plane information over the control plane, from the provider CPE to the consumer CPE. The service definition is associated with a service, available with the provider CPE. The consumer CPE may further create a service anchor point based on at least one identifier of the service definition and transmit a network address translation (NAT) IP request in response to creation of the service anchor point, to the provider CPE. The consumer CPE may further receive a network address translation (NAT) IP in response to the NAT IP request using the at least one identifier of the service definition, from the provider CPE. The NAT IP is associated with the service anchor point, of the consumer CPE. A stateless service is instantiated, on the consumer CPE, using the NAT IP.

In some embodiments, the stateless service on the consumer CPE is an extranet provider service instance of the provider CPE. The at least one attribute of the NHOP includes a CPE identity, a public IP address, and a core node attachment. The one or more identifiers of the service definition includes a service provider name, a service provider ID, and an IP pool. The service definition is transmitted as the control plane information over the control plane. The NAT IP is associated with a fully qualified domain name (FQDN) of a DNS-server hosted on the consumer CPE. The NAT IP is a unique NAT IP in a network address translation table.

In another embodiment, the service definition is encrypted, by the provider CPE, using an encryption key, associated with the consumer CPE. The service definition is decrypted to configure the at least one identifier of the service definition, by the consumer CPE. The service definition is associated with a virtual routing and forwarding (VRF) label, a virtual private network (VPN) label, a source internet protocol (IP) address, and a destination IP address.

The embodiments of this disclosure will now be described with reference to the abovementioned stateless extranet. However, a person skilled in the art would understand that for explanation purposes, these embodiments may also include any combination of encapsulation and/or encryption techniques and may be included within the scope of this disclosure.

These and other embodiments of the methods and systems are described in more detail with reference to FIGS. 1-5.

Figure 1:
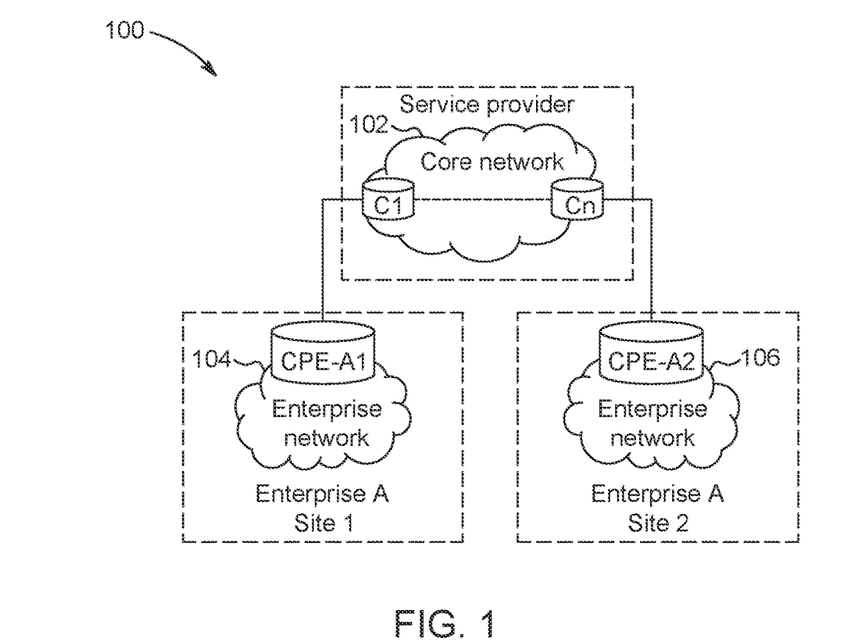
FIG. 1 illustrates a network architecture for implementing disclosed embodiments of a stateless extranet, according to an embodiment.

FIG. 1 illustrates a network architecture 100, in accordance with an embodiment. In this embodiment, the network architecture 100 may include a core network 102 operated by a service provider and an enterprise network 104 operated by a customer enterprise A and located at site 1. The network architecture 100 may also include an enterprise network 106 operated by the same customer enterprise A and located at site 2 that may be geographically separated from site 1. Further, the core network 102 may represent a network owned and/or operated by the service provider to provide connectivity services to one or more customers, such as the customer enterprise A depicted in FIG. 1. For example, the enterprise network 104 may communicate with the enterprise network 106 in a secure manner via the core network 102.

A person skilled in the art would understand that it is not necessary that the enterprise network 104 and enterprise network 106 are operated by the same customer and they may be owned/managed by different customers as well. For example, both these enterprise networks may either be different internal networks (e.g., intranets) of the same organization, at different geographical locations or they may be networks owned, managed, and operated by separate organizations, at different locations. Additionally, there can be any number of enterprise networks in the network architecture 100 and one or more of these enterprise networks may be operated by one customer while the remaining may be owned by other customer(s). Further, such enterprise networks may be located geographically in different locations, which may either be in proximity to each other or remotely located with respect to each other.

Referring to FIG. 1, the core network 102 may represent backend infrastructure that may provide routing paths for exchange of information between different enterprise networks such as enterprise networks 104 and 106. The core network 102, in some embodiments, may be referred to as the service provider network (or network core or service provider core or backbone network) without departing from the scope of the ongoing description. The core network 102 may include one or more core nodes C1 to Cn, as shown in FIG. 1, as described earlier in this disclosure.

In one example, a CPE-A1 (e.g., a consumer CPE) and a CPE-A2 (e.g., a provider CPE) may be a part of the enterprise network 104 and the enterprise network 106, respectively. Further, the core network 102 may communicate with the enterprise networks (e.g., 104 and 106) through at least one enterprise node (e.g., CPE-A1, CPE-A2 respectively). Thus, the core network 102 may facilitate exchange of information between enterprise networks 104 and 106.

It would be apparent to a person skilled in the art that an enterprise (such as enterprise A) may include more than one enterprise networks at multiple locations. FIG. 1 merely exhibits a non-limiting example of two remote sites of enterprise A. Other configurations and scenarios are also possible where information can be exchanged between multiple sites of enterprise A. Information may be exchanged between one or more sites of the enterprise A and one or more sites of other enterprise(s) B, C, D (not shown) and so on, and irrespective of whether all such sites are remote or proximate with respect to each other.

Figure 2:
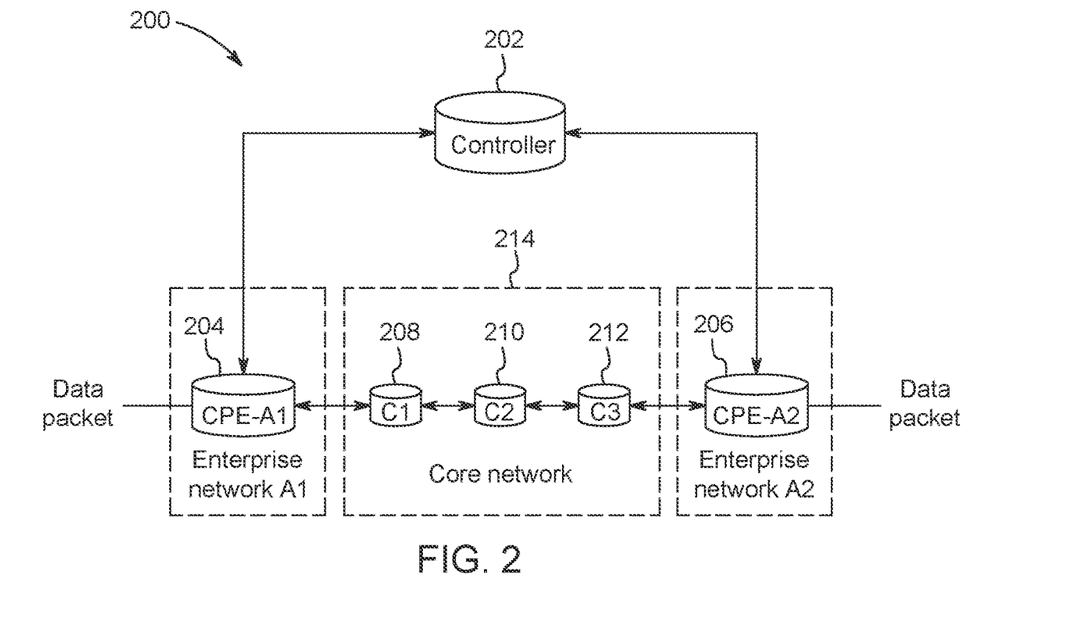
FIG. 2 illustrates a more detailed network architecture for implementing disclosed embodiments of a stateless extranet, according to an embodiment.

FIG. 2 illustrates a more detailed example network architecture 200 in accordance with an embodiment. FIG. 2 will be explained in conjunction with description of FIG. 1. Specifically, components having the same name are to be understood as similar in functionality and characteristics. As depicted in FIG. 2, a core network 214 may include one or more core nodes such as C1 208, C2 210, and C3 212, which may be equivalent to the core network 102 including the core nodes C1 to Cn of FIG. 1. The network architecture 200 may also include a controller 202, one or more enterprise nodes or CPEs such as a consumer CPE-A1 204 and a provider CPE-A2 206, which may be equivalent to CPE-A1 and CPE-A2, as described in the context of FIG. 1. In an embodiment, the controller 202 may be a dedicated controller for a customer, such as enterprise A, to facilitate communication between the CPEs of enterprise networks A1 and A2 via the core network 214. In another embodiment, the controller 202 may be a multi-tenant controller configured for multiple tenants such as enterprise A, enterprise B, enterprise C (not shown) and so on. The multi-tenant controller may include logical segmentation for different customers and thus, confidentiality may be maintained across different customers.

Additionally, the controller 202 may correspond to a server computing device associated with the customer A. The controller 202 may, for instance, be a centralized managing node that may be owned, leased, and/or operated by the customer A to manage communication between the enterprise nodes owned and operated by the customer A. The controller 202 may, for instance, facilitate control plane functions associated with the enterprise networks A1 and A2, as described later in this disclosure. Based on the control plane functions, the controller 202 may also facilitate establishment of a data plane that connects the enterprise networks A1 and A2 for communication of data packets between these enterprise networks. Additionally, the controller 202 may also facilitate configuration of the respective CPEs (consumer CPE and provider CPE) of these enterprise networks, for communication over the data plane, as described later in this disclosure. In an embodiment, the controller 202 may be an "off path" controller, which is a dedicated controller specifically configured to perform the above-described functions. In an alternate embodiment, the controller 202 may be an "in-band" controller. An in-band controller may be implemented in one or more core nodes, configured to perform the above-described control plane functions in addition to being configured to perform the data plane functions of the core node, as described later in this disclosure.

In an embodiment, the controller 202 may facilitate exchange of control information over a control plane between CPE-A1 204 and CPE-A2 206. The control information may include, but not limited to, routing information (e.g., MPLS labels), encryption keys/security association information, and core network association information. The controller 202 may then facilitate setting up secure communication channels between various enterprise nodes such as CPE-A1 204 and CPE-A2 206 in the form of end-to-end IPsec tunnels. These tunnels may be set up to enable direct and secure communication between the enterprise nodes over the data plane.

In one example, a secure control plane is established by means of certificate-based authentication using protocols such as TLS or IPsec/IKE. These protocols are capable of endpoint authentication and encryption key negotiation within each single protocol framework. The controller 202 may then, receive encryption keys from CPE-A2 206, and transmit them to CPE-A1 204 or receive encryption keys from CPE-A1 204, and transmit them to CPE-A2 206, in accordance with an embodiment. In an embodiment, the above (control plane) procedures may be performed before CPE-A1 204 transmits a data packet to CPE-A2 206, via the data plane. The key sharing by the controller 202 may enable CPE-A2 206 to subsequently decrypt (and decapsulate) the data packet transmitted by CPE-A1 204, via the core network 214.

In an embodiment, the controller 202 may at least include a processor, a memory storage and one or more hardware and/or software modules, as may be required for implementing the above-described functions of the controller 202. In one example, the controller 202 may be a software-defined wide area networks (SDWAN) controller, which may include but not limited, an Application Policy Infrastructure Controller (APIC), a vManage Controller, a vSmart controller, and so on.

Figure 3A:
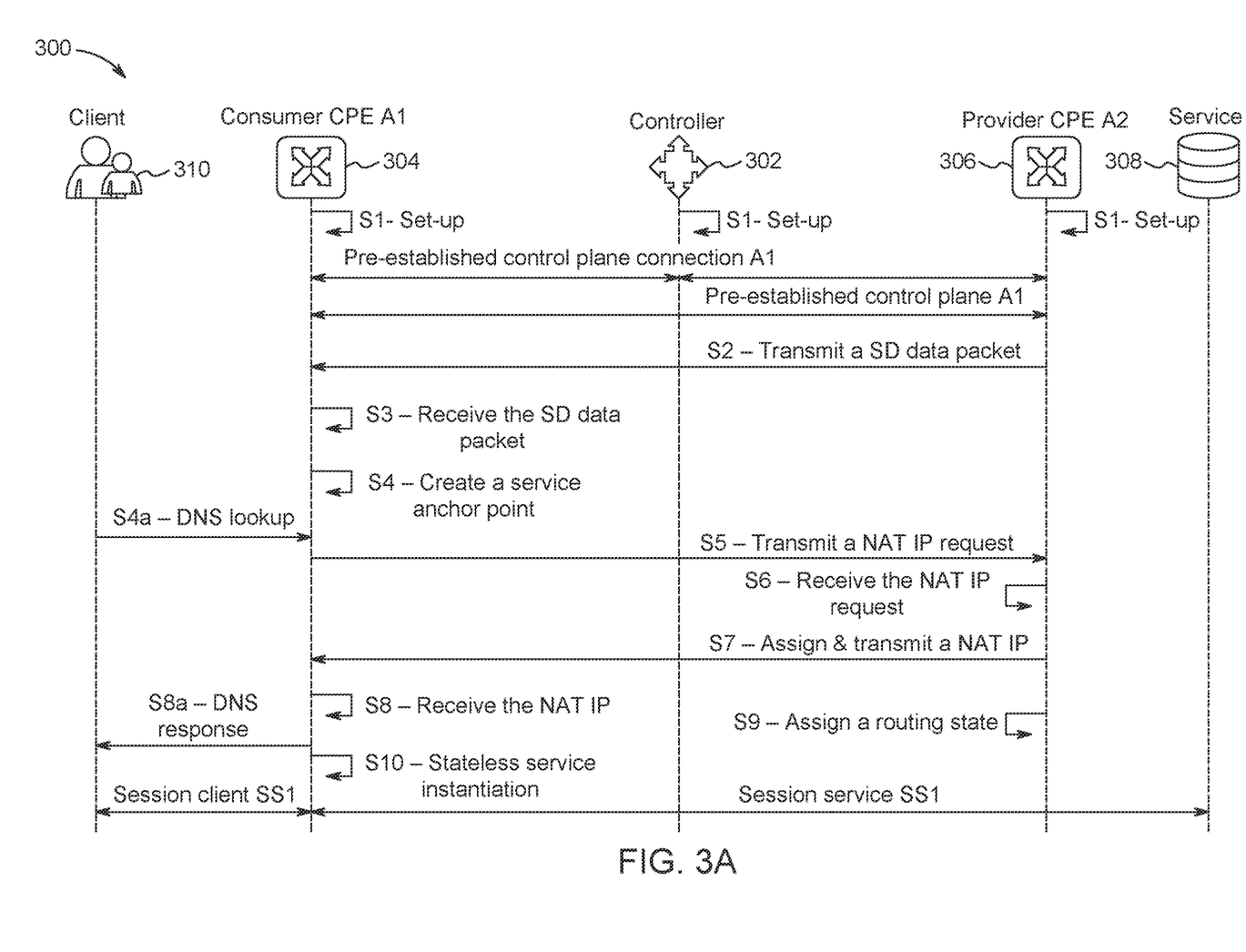
FIG. 3A is a signal flow diagram to illustrate flow of a data traffic between enterprise nodes of enterprise networks, according to an embodiment.

FIG. 3A is a signal flow diagram 300 to illustrate the flow of a data traffic between enterprise nodes of the enterprise networks, in accordance with an embodiment. The signal flow diagram illustrates a service 308 that may be available for use by a client, such as a client 310 in an enterprise network. The client 310 is connected to a consumer CPE-A1 304 (equivalent to the CPE-A1 204 in its functionality) and the consumer CPE-A1 304 connects to a provider CPE-A2 306 (equivalent to the CPE-A2 206 in its functionality) through a controller 302 (equivalent to the controller 202 in its functionality), and a core network (such as the core network 214 in its functionality), as described above.

Step S1 of the illustrated method in FIG. 3A, may include a "set-up" phase. In the set-up phase, all nodes in the enterprise network may be configured to establish connections with other nodes to implement the steps of the illustrated method, as described herein. In an embodiment, the provider CPE-A2 306 and the consumer CPE-A1 304 have a pre-established control plane connection A1 with the controller 302. Based on functions of the control plane, the controller 302 may also facilitate further establishment of a data plane connection or works with a pre-established data plane A2 that connects the provider CPE-A2 306 and the consumer CPE-A1 304 for communication of data packets between the CPEs via a secure communication tunnel directly. In an embodiment, the above (control plane and data plane establishment) procedures may be performed before the provider CPE-A2 306 transmits a service definition to the consumer CPE-A1 304, as a control plane information over the control plane.

On establishment of the data plane connection A2 between the consumer CPE-A1 304 and the provider CPE-A2 306, the CPEs exchange data traffic including a data structure that has information about their connection with the network and other information that is needed for them to communicate with each other. In an embodiment, a service advertisement is part of a communication between the CPEs and as a control plane information over the control plane. Existing fields on the control plane traffic headers match the service definitions as they have been instantiated on the consumer CPEs. In one example, an information in header field of a control plane information, may or may not match the service definition. If it matches, it proceeds in a path provided by service anchor point, otherwise it does not connect.

In step S2, the provider CPE-A2 306 transmits a service definition (SD) data packet to advertise the service 308 to the consumer CPE-A1 304. Thus, the consumer CPE-A1 304 becomes aware of the service(s) provided, enterprise ID and other information.

A person skilled in the art would understand that in an alternate embodiment, CPE-A2 306 may be a source node and may thus, create the service definition instead of receiving the service definition from any subsequent node in the enterprise network. While transmitting the service definition, the provider CPE-A2 306 advertises the service associated with the service provider that it intends to make available for clients.

In one embodiment, the service definition is associated with a service available with the provider CPE. The service definition has identifiers such as, but not limited to, name, provider service ID, enterprise service ID, IP pool. The service definition is transmitted as a control plane information over the control plane information. In one illustrative example, the service definition includes a name: service1.provider.com; a provider service ID: Provider-ID; an enterprise service ID: Enterprise-ID, an IP pool: Service1 10.1.0.0/16 and an encryption key, to advertise a service SAFI: Service1.

In one embodiment, the provider CPE-A1 304 creates a service instance that includes a dedicated VRF table along with the IP pool of private IPv4 or IPv6 addresses. Consumers who have been defined with the consumer CPE-A1 304 will automatically receive an update describing the service instance. IP addresses are rendered to consumers with the same IP pool addresses that are free or available. As per the methods disclosed herein, the IP pool addresses are unique and re-usable, hence the scalability of the network is significantly improved. For example, a smaller set of IP addresses can be used for multiple services at a lower cost, or the same service can be used by a greater number of consumers. Following NAT IP establishment, return traffic from provider to consumer follows routing, since this is the purpose of the public IP presented in NHOP or the DHCP assigned IP. In an embodiment, either of the IPs acts as the source IP representing the consumer CPE.

In an embodiment, the controller 302 creates a virtual overlay network to establish connection and facilitate control plane communication between the provider CPE and the consumer CPE. A service advertisement carries information about the underlay network attachment, also referred as NHOP, of the originating/provider CPE. The NHOP includes information on how a CPE is attached to the network along with encryption keys to allow for a secure tunnel to be established between the provider CPE and the consumer CPE for data plane communication.

In step S3, the consumer CPE-A1 304 receives the service definition, from the provider CPE-A2 306. Along with the service definition, the consumer CPE receives the service advertisement associated with the service 308 on the provider CPE-A2 306 that it intends to make available for consumer(s).

In one embodiment, the service advertisement from the provider CPE-A2 306 contains all the required information for the receiving consumer CPE-A1 304 to be able to subscribe to the complete extranet service, service location and redundancy, service FQDN and IP-address information. The service advertisement also serves to direct the DHCP client on the consumer CPE-A1 304 to the accurate server for acquiring the service access IP-address. Existing extranet solutions operate by exchanging all or portions of participants routing tables and the present disclosure eliminates that requirement. The solution allows for the provider CPE-A2 306 to extend IP-addressing to the consumers of the service 308 and hence consumption is dependent on provider address space only. The consumer CPEs can either permanently or sporadically consume the service 308 depending on any set preferences and this can be tracked via traffic and DHCP address consumption patterns.

The consumer CPEs A1 304 are defined by creating a consumer service instance for receiving service advertisements. Once the service advertisement has been received, the consumer CPE-A1 304 creates a service anchor point and requests an IP-address from the provider CPE-A2 306. The requested IP-address is used as the IP-address for the anchor point and as the source IP-address for traffic intended for the provider CPE-A2 306. As part of the service instance creation, a local IP-address is used for end-users/clients representing the service. This IP-address representing the service is also tied to a fully qualified domain name (FQDN) stored in a DNS-server hosted on the consumer CPE-A1 304. This enables completely transparent service consumption for end-users without the need for any additional software or tool.

In step S4, the consumer CPE-A1 304 creates the service anchor point based on an identifier of the service definition. The service anchor point defines the service instance through a service instantiation having a domain name system (DNS) and a destination (Dst) NAT. In one example, the service instantiation has a DNS: service1.provider.com IN A Enterprise-ID and a Dst NAT: Enterprise-ID <-> Provider-ID. The service anchor point is an instantiation of a routing domain on the consumer CPE specifically created for the service being consumed. The routing domain may implement VRF and includes a virtual interface (such as a loopback) that hosts the IP-address used by the consumer for the specific service. This is independent of the IP-address being private or public in nature. By using service anchor points, it is possible for the consumer CPE-A1 304 to be a consumer of multiple services without regard to whether each service will require the use of a public or private consumer IP-address and if those addresses may be overlapping or not.

The service anchor point is a logical instance on the consumer CPE-A1 304 or to multiple consumer CPEs. At step S4a, the consumer CPE-A1 304 provides a DNS lookup (e.g., service1.provider.com). The consumer CPE-A1 304 configures its service anchor point and the necessary data structures to instantiate a service on the consumer CPE-A1 304. After a confirmation of the DNS lookup, the consumer CPE-A1 304 can enable a client 310 or a group of such clients to consume the service 308.

At step S5, the consumer CPE-A1 304 transmits a network address translation (NAT) IP request, in response to creation of the service anchor point, as an allocation request to the provider CPE-A2 306. At step S6, the provider CPE-A2 306 receives the NAT IP request, from the consumer CPE-A1 304.

At step S7, the provider CPE-A2 306 assigns a network address translation (NAT) IP as an allocation response. In an embodiment, the provider CPE-A2 306 assigns and transmits the NAT IP to the consumer CPE-A1 304, using an identifier of the service definition. The NAT IP is associated with the service anchor point, of the consumer CPE-A1 304.

The method described above ensures that the provider CPE-A2 306 is not dependent on the network structure of the consumer CPE-A1 304 alone. The consumer CPE-A1 304 uses the NAT IP allocated on the provider side. The IP-address that is presented to the provider CPE-A2 306, for a secure connection, is always the one that the provider CPE-A2 306 has assigned to the consumer CPE-A1 304 (specifically). The provider CPE-A2 306 allows the service instance of the service 308 to be presented to the consumer CPE-A1 304 using one of any IP addresses that is available in the IP pool of the service definition and thus eliminating any potential IP address conflict.

Further, at step S8, the consumer CPE-A1 304 receives the NAT IP and sends a DNS response at step S8a to the client 310. At step S9, a routing state is determined and assigned at the provider CPE-A2 306 where the routing state corresponds to NAT IP via A1 connection. A service session instance may be established temporarily and may be terminated or provided to the other set of users based on the same IP pool addresses. This would improve scalability with a smaller set of IP addresses.

At step S10, a stateless service is instantiated on the consumer CPE-A1 304 using the NAT IP. In one illustrative example, the service instantiation corresponds to source (Src) NAT: Client IP <-> Assigned NAT IP. There is no need for further exchange of routing information between the provider CPE-A2 306 and consumer CPE-A1 304 and the routed exchange of traffic can be enabled without any requirement of traditional routing state.

The above steps will further establish a secure and reliable stateless session between the client 310 and the consumer CPE-A1 304. The stateless session includes a session client SS1, established between the client 310 and the consumer CPE-A1 304 and a session service SS1, established between the consumer CPE-A1 304 and the service 308. In one example, the session client SS1 has a direct communication session with source as Client-ID: Client-Private-Port and destination as Enterprise-ID: Service-Port. Further, the session client SS1 enables the consumer CPE-A1 304 to send data or requests with source-IP as Enterprise-ID: Service-Port and destination-IP as Client-ID: Client-Private-Port to receive data or requests. The session service SS1 has a direct communication session with source as NAT-IP: Client-Public-Port and destination as Provider-ID: Service-Port to send data or requests and with source-IP as Provider-ID: Service-Port and destination-IP as NAT-IP: Client-Public-Port to receive data or requests.

Figure 3B:
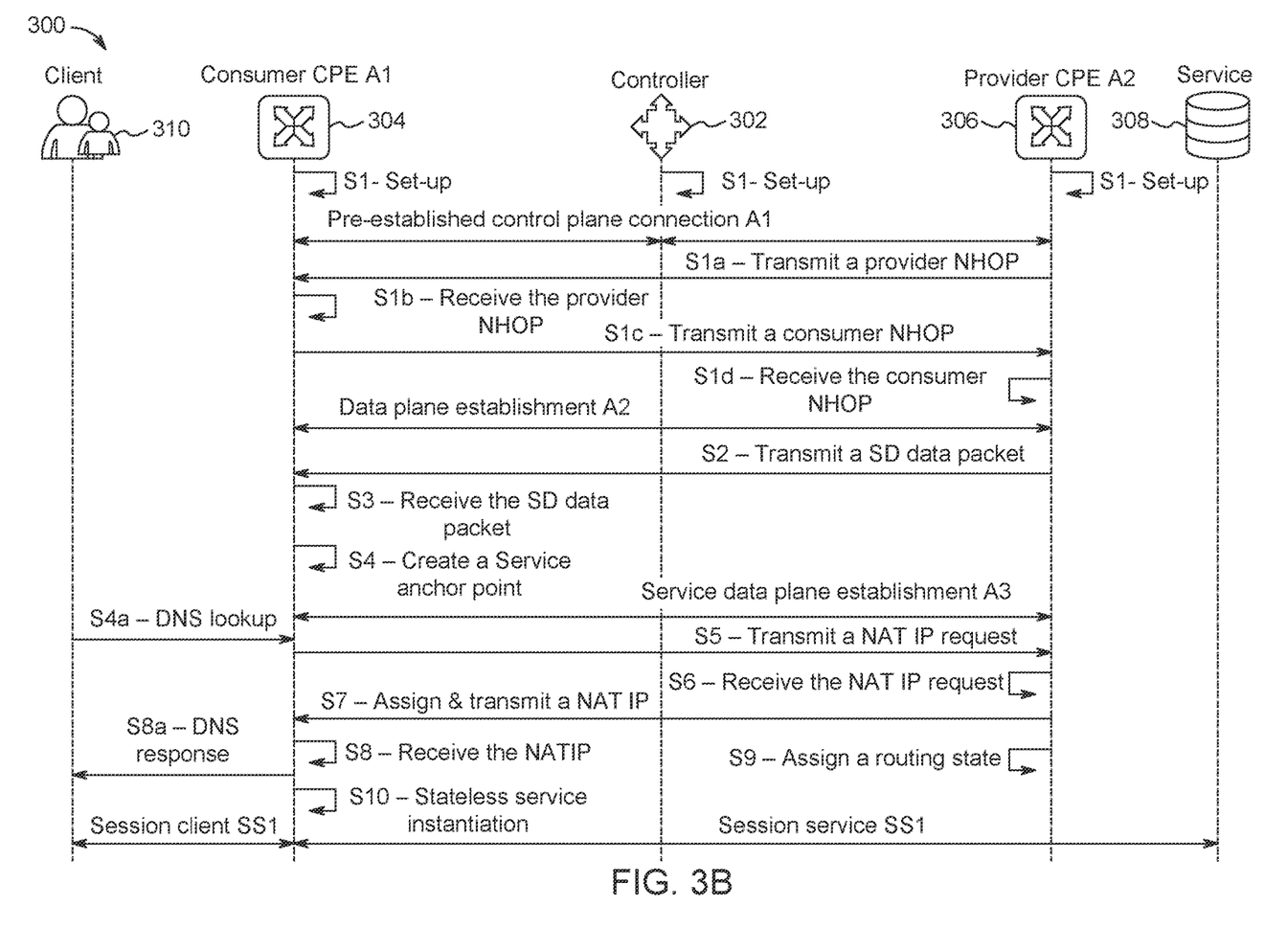
FIG. 3B is a signal flow diagram to illustrate flow of a data traffic between enterprise nodes of enterprise networks, according to one another embodiment.

FIG. 3B is a signal flow diagram 300 to illustrate the flow of a data traffic between enterprise nodes of the enterprise networks, in accordance with one another embodiment. Many of the steps in FIG. 3B are in same manner as described in FIG. 3A and are not described in detail for brevity. The steps that are added or modified with respect to FIG. 3A will now be explained in detail with reference to FIG. 3B. In one embodiment, a variation to the consumer CPE-A1 304 and the provider CPE-A2 306 is described in its functionality, that communicates using a private IP connection, a service encryption key, exchanges a provider NHOP and a consumer NHOP, and establishes a data plane and a secure communication tunnel in the data plane. An endpoint address may be exchanged as part of the NHOP and there would not be a need for an in-band address assignment function, but the rest of the establishment process would be the same. On the consumer CPE side, the abstraction of clients would still be provided using NAT IP and DNS, so no further routing information is required to be exchanged.

Step S1 of the illustrated method in FIG. 3B, may include a "set-up phase", as described in general in FIG. 3A and additionally as described below with reference to establishment of the data plane connection A2. After establishment of the control plane connection A1 or with the pre-established control plane connection A1 between the controller 302 and the CPEs, a provider NHOP is advertised by the provider CPE-A2 306. At step S1a, the provider CPE-A2 306 may transmit the provider NHOP to the consumer CPE-A1 304. At step S1b, the consumer CPE-A1 304 may receive the provider NHOP. The consumer CPE-A1 304 has an underlay network attachment information included in a consumer NHOP. At step S1c, the consumer CPE-A1 304 may advertise/transmit the consumer NHOP to the provider CPE-A2 306. At step S1d, the provider CPE-A2 306 may receive the consumer NHOP. In one embodiment, the consumer CPEs A1 304 learns about the provider NHOP and associated information from the provider CPE-A2 306 along with the service advertisement. The above-described steps enable the data plane establishment A2 between the provider CPE-A2 306 and the consumer CPE-A1 304 and allows the consumer CPE-A1 304 to set the secure communication tunnel up to the provider CPE-A2 306.

The NHOP refers to a data structure shared between members of the control plane domain, regardless of that is inline or off-path, that describes the nature of each attached interface on the CPEs. The CPE receiving an NHOP from another CPE will be equipped with all the information required to communicate with a remotely located CPE. The NHOP includes information on how the CPE is attached to the network along with encryption keys to allow for the secure tunnel to be established between the provider and consumer CPEs. In one embodiment, for connections using a private IP, the NHOP attributes include a CPE identity, a public WAN IP address, a core node attachment, and an encryption key. In an embodiment, services and NHOPs are distributed in the control plane.

In an embodiment, the steps of FIG. 3A can be followed in steps S2 to S10 in entirety or in steps for brevity. In one embodiment, a service data plane establishment A3 is performed between the provider CPE-A2 306 and the consumer CPE-A1 304 after the service anchor point is instantiated in step S4 (using consumer NHOP and provider service keys). The service data plane establishment A3 is a requirement for IP address exchange in a private IP connection. Further, the NAT IP associated with the service anchor point, of the consumer CPE-A1 304, in the service data plane, instantiates a stateless service on the consumer CPE-A1 304 in the manner as described in FIG. 3A. In one example, the data plane is not exclusive to a single service and multiple services can share the data plane connection between the CPEs. The service data plane can be made exclusively available for a service to a CPE.

Figure 3C:
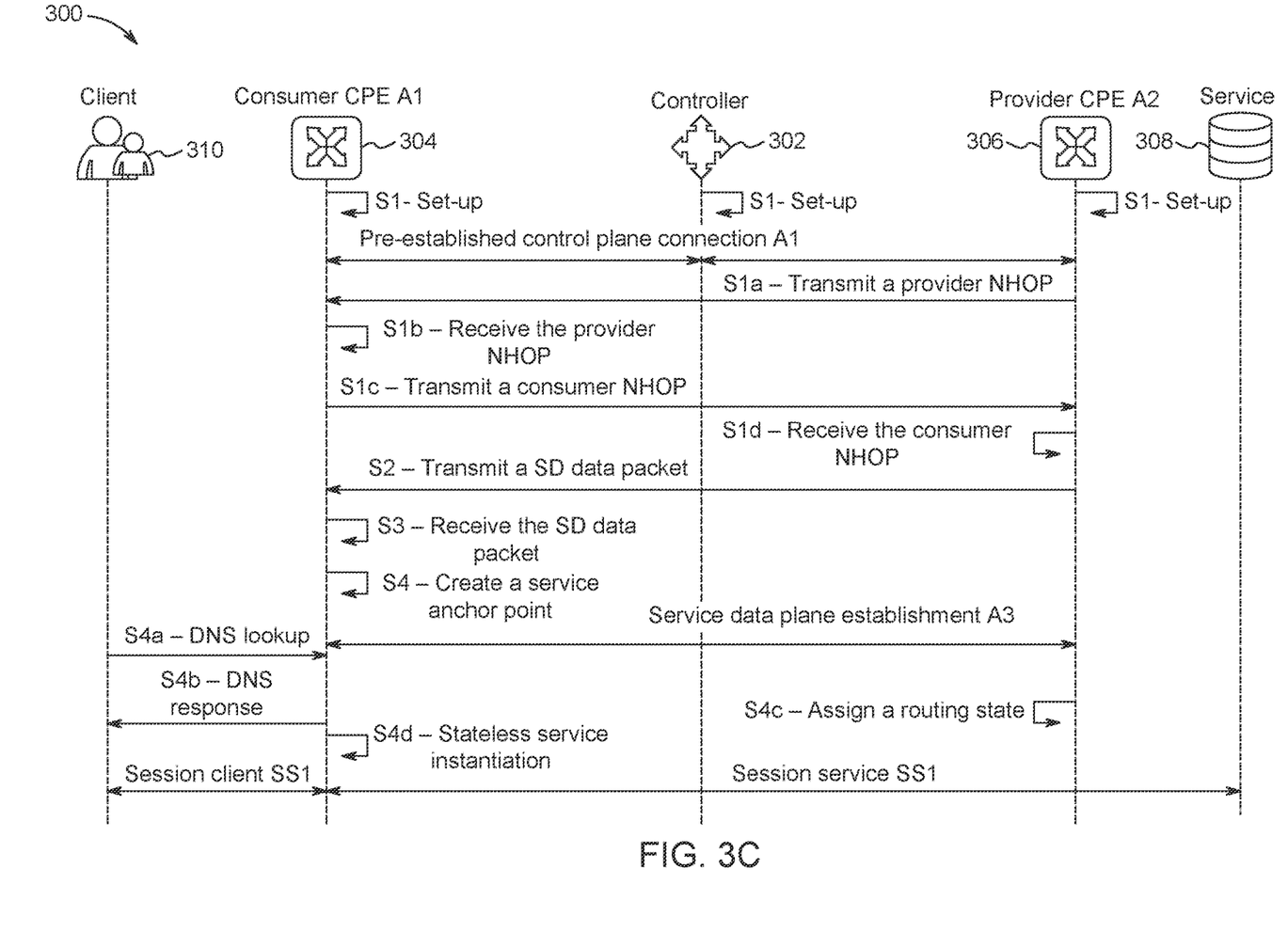
FIG. 3C is a signal flow diagram to illustrate flow of a data traffic between enterprise nodes of enterprise networks, according to one another embodiment.

FIG. 3C is a signal flow diagram 300 to illustrate the flow of a data traffic between enterprise nodes of the enterprise networks, in accordance with one another embodiment. Many of the steps in FIG. 3C are performed in same manner as described in FIG. 3A and FIG. 3B and are not described in detail for brevity. The steps that are added or modified with respect to FIG. 3A and FIG. 3B will now be explained in detail with reference to FIG. 3C. In one embodiment, a variation to the consumer CPE-A1 304 and the provider CPE-A2 306 is described in its functionality. The consumer CPE-A1 304 and the provider CPE-A2 306 communicates using a public IP connection, a service encryption key, exchanges a provider NHOP and a consumer NHOP to establish identities, and establishes a data plane and a secure communication tunnel in the data plane. In cases where the consumer side wants to use a globally unique public IP address, the service can be consumed using these IP addresses to establish a link to the advertised service. In an embodiment, the establishment of the identities between the consumer CPE-A1 304 and the provider CPE-A2 306 will not be based on the IP pool that is hosted on the provider side.

Step S1 of the illustrated method in FIG. 3C, may include a "set-up phase", as described in general in FIG. 3A and additionally as described below with reference to establishment of the data plane connection A2 using an NHOP exchange in FIG. 3B. In an alternative embodiment, for connections using a public IP, the NHOP attributes include a CPE identity, a public WAN IP address, a core node attachment, an encryption key, and a public service IP (pre-assigned). The steps S2 to S4 for transmitting and receiving the service definition and creating the service anchor point at the consumer CPE-A1 304 can be read in the manner as described in FIG. 3A. In FIG. 3C, the steps S5 to S8 as described in FIG. 3A or FIG. 3B can be skipped and S4a may be performed that of sending a DNS response from the consumer CPE-A1 304 to the client 310 and defining the routing state: Public-IP via A1. In one embodiment, the service data plane establishment A3 is performed between the provider CPE-A2 306 and the consumer CPE-A1 304 after the service anchor point is created at S4, where consumer NHOP and provider service keys are used in a public IP set up. The service data plane establishment A3 is a requirement for IP address exchange in a public IP connection. Further, the NAT IP associated with the service anchor point, of the consumer CPE-A1 304, in the service data plane, instantiates a stateless service on the consumer CPE-A1 304 in the manner as described in FIG. 3A.

In one embodiment, periodic service consumption between the consumer CPE-A1 304 and the provider CPE-A2 306 depends on the nature of service distribution and the consumption pattern that needs to be established. The consumption pattern includes consumption controlled by a control plane policy, a policy that is used to determine when service advertisements are distributed to the consumer CPEs. For example, the control plane policy may include a policy that will determine when the advertisements are withdrawn to disable the service. In a consumption controlled by embedded policy, service advertisements carry the embedded policy as an attribute of the control plane information with the CPE and create a consumption pattern based on the received policy. This pattern is associated with the service anchor point on the CPE. In a consumption controlled by advertisement, the originating provider generates and withdraws service advertisements based on the desired consumption pattern. In a consumption controlled by service lifetime, service advertisements carry an attribute that describes the time duration for which the service is valid. Thereafter, the service will be disabled on the provider CPE and the consumer CPEs will unsubscribe or discontinue the service automatically as and when the service advertisement expires. In one example, a service X is advertised and consumed, and the service X is linked to a policy P. The policy P is instantiated both in the control plane as well as on the consumer CPE. It notifies the consumer CPE that service X is available for use, for a period/duration, at a time (of day, week, month, or year etc.). The policy enables the provider CPE to provide the available service for use by the consumer CPE, as determined by usage, rights and authentication.

Figure 4A:
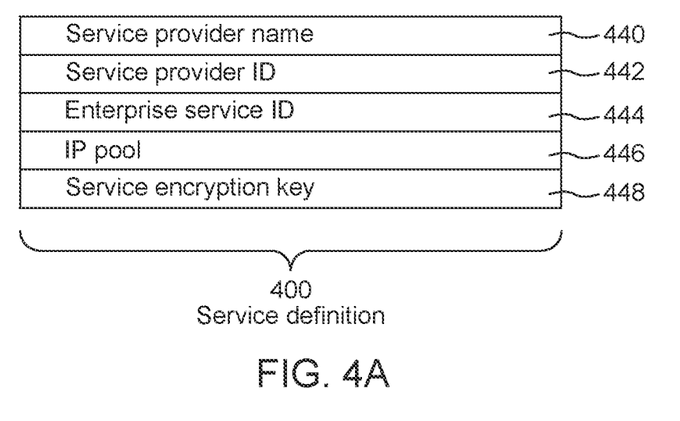
FIG. 4A illustrates an example format of a service definition, according to an embodiment.

FIG. 4A illustrates an example format of a service definition 400, in accordance with the embodiments of this disclosure. The service definition 400 is transmitted as a control plane information over the control plane in the embodiments of this disclosure. The service definition 400 may include a service provider name 440, a service provider ID 442, an enterprise service id 444, an IP pool 446, and a service encryption key 448.

In one example, the service definition has a name: service1.provider.com; a provider service ID: Provider-ID; an enterprise service ID: enterprise-ID and an IP pool: Service1 10.1.0.0/16. The service definition 400 is transmitted from the provider CPE-A2 306 to the consumer CPE-A1 304 and is associated with a service available with the provider CPE-A2 306. Further, the consumer CPE-A1 304 receives the service definition of an advertised service in the service definition 400, from the provider CPE-A2 306. The service definition 400 assists the consumer CPE-A1 304 to activate a service instantiation with DNS: service1.provider.com IN An Enterprise-ID and Dst NAT: Enterprise-ID <-> Provider-ID, in an example.

Figure 4B:
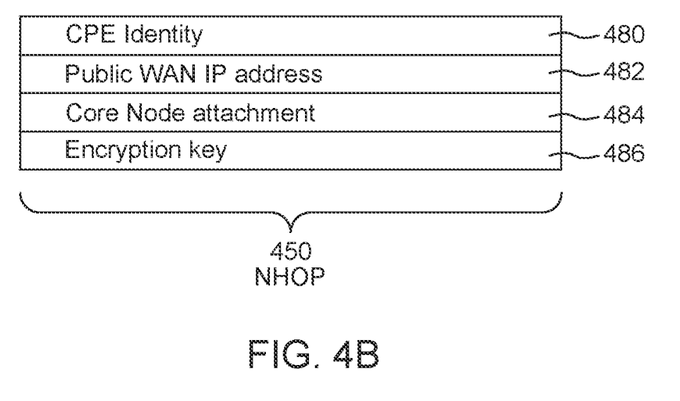
FIG. 4B illustrates an example format of a NHOP, according to an embodiment.

FIG. 4B illustrates an example format of a NHOP, in accordance with the embodiments of this disclosure. The NHOP 450 includes attributes such as the IP-address or the underlay interface, the public portion of an encryption key used to communicate with the specific NHOP, device identity, load-balancing information, core network attachment and more, in the embodiments of this disclosure. The NHOP 450 may include a CPE identity 480, a public WAN IP address 482, a core node attachment 484, and an encryption key 486.

In one embodiment, the NHOP 450 is advertised by the provider CPE-A2 306 and has NHOP Attributes, such as a CPE identity, a public WAN IP address, a core node attachment, an encryption key of the provider CPE-A2 306. The NHOP attributes are received at the consumer CPE-A1 304 in an extranet service advertisement and data plane for public consumer IP and service encryption key environment. A public service IP (pre-assigned) of the consumer CPE-A1 304, advertises a consumer NHOP to the provider CPE-A2 306. It establishes a data plane between the provider CPE-A2 306 and the consumer CPE-A1 304 if provider NHOP encryption key is used.

In one embodiment, the NHOP 450 is advertised by the provider CPE-A2 306 and has NHOP attributes, such as a CPE identity, a public WAN IP address, a core node attachment, an encryption key of the provider CPE-A2 306. The NHOP attributes are received at the consumer CPE-A1 304 in an extranet service advertisement using a data plane for private consumer IP and service encryption key environment. Further, the consumer CPE-A1 304 advertises a consumer NHOP to the provider CPE-A2 306 and establishes a data plane between the provider CPE-A2 306 and the consumer CPE-A1 304 if provider NHOP encryption key is used.

Figure 5:
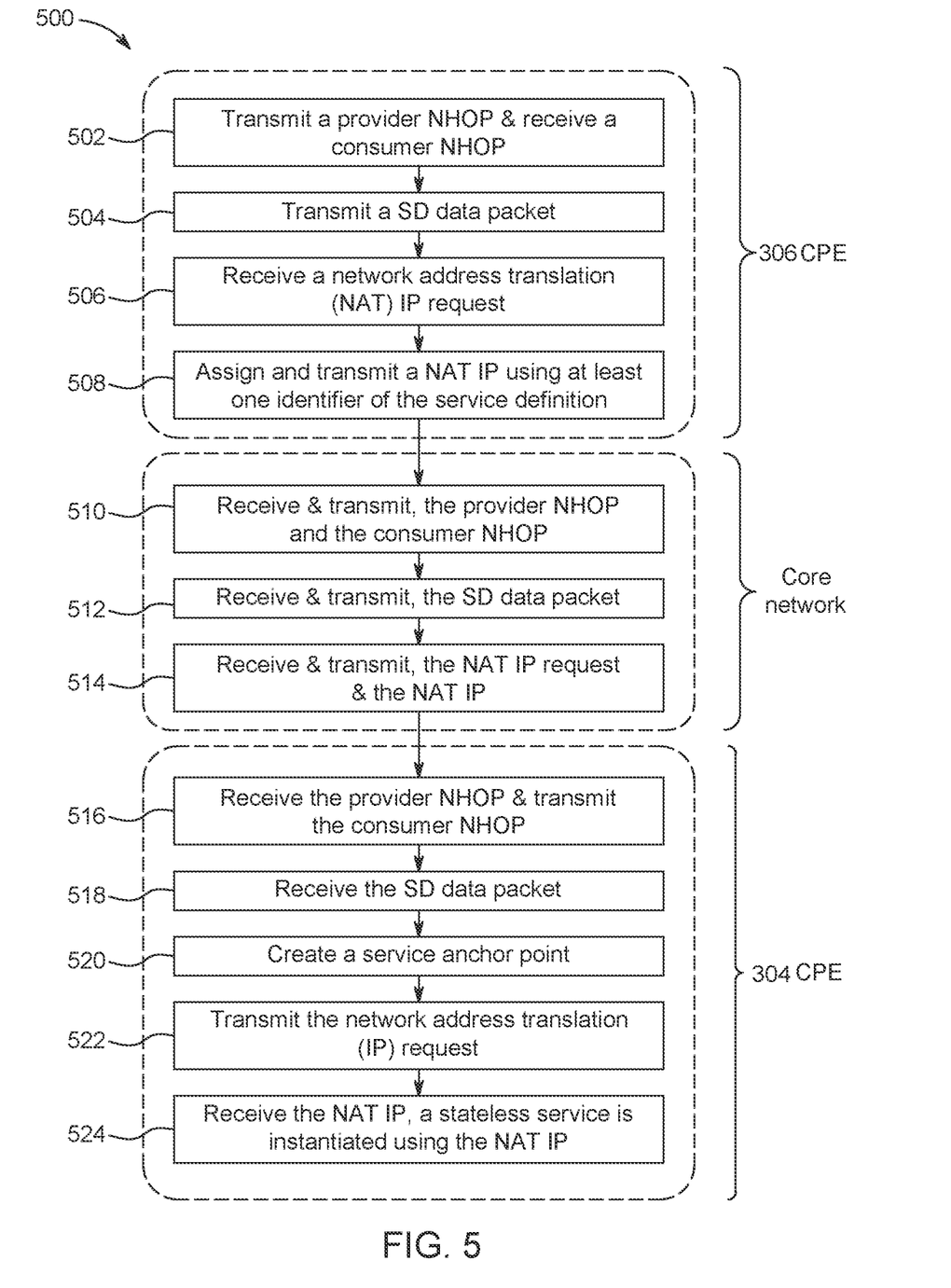
FIG. 5 is a flowchart illustrating the steps involved in instantiation of stateless extranet between enterprise nodes of enterprise networks, according to an embodiment.

FIG. 5 is a flowchart 500 illustrating the steps involved in instantiation of stateless extranet between enterprise nodes of enterprise networks, in accordance with the embodiments of this disclosure. In one example, these steps may be implemented in a communication network, such as the network architecture 200 illustrated in FIG. 2 and may use the signal flow of FIG. 3A, 3B, and 3C. As illustrated in FIG. 5, steps 502 to 508 may be performed by the provider CPE such as CPE-A2 206 of FIG. 2 or 306 of FIG. 3A, 3B and 3C. Further, steps 510 to 514 may be performed in a core network corresponding to the core network 214, or via the controller 202 of FIG. 2. Further, steps 516 to 524 may be performed by the consumer CPE, which may correspond to CPE-A1 204 of FIG. 2 or 304 of FIG. 3A, 3B and 3C. Each step in FIG. 5 may be executed in a manner like the steps discussed in FIG. 3A, 3B and 3C and therefore, may not be described extensively again for brevity.

Referring to FIG. 5, at step 502, the provider CPE (CPE-A2 206 or 306) may transmit the provider NHOP from the provider CPE-A2 306 to the consumer CPE-A1 304 and receive the consumer NHOP from the consumer CPE-A1 304, in a control plane in the manner described earlier. In an embodiment, the provider NHOP is associated with at least one attribute of an NHOP. The at least one attribute of the NHOP is associated with an encryption key available with the provider CPE-A2 306 to establish the secure communication tunnel in the data plane from the provider CPE-A2 306 to the consumer CPE-A1 304. The consumer NHOP is associated with at least one attribute of the NHOP from the consumer's perspective.

At step 504, the provider CPE-A2 306 may transmit the service definition as a control plane information over the control plane, from the provider CPE-A2 306 to a consumer CPE-A1 304. The service definition is associated with a service available with the provider CPE-A2 306, in the manner described earlier. At step 506, the provider CPE-A2 306 may receive a network address translation (NAT) IP request, from the consumer CPE-A1 304, in the manner described earlier. At step 508, the provider CPE-A2 306 may assign and transmit a network address translation (NAT) IP, to the consumer CPE-A1 304, in the manner described earlier. In an embodiment, the NAT IP is assigned using at least one identifier of the service definition. The NAT IP is associated with a service anchor point, of the consumer CPE-A1 304.

At step 510, the core network 214 (e.g., C1-C3) via the controller 202 (or 302) may receive & transmit the provider NHOP from the provider CPE-A2 306 to the consumer CPE-A1 304 and the consumer NHOP from the consumer CPE-A1 304 to the provider CPE-A2 306, in the control plane in the manner described earlier. At step 512, the core network 214 may receive & transmit the service definition as a control plane information over the control plane, from the provider CPE-A2 306 to the consumer CPE-A1 304, in the manner described earlier. At step 514, the core network 214 may receive & transmit the NAT IP request and the NAT IP between the provider CPE-A2 306 and the consumer CPE-A1 304, in the manner described earlier.

At step 516, the consumer CPE (CPE-A1 204 or 304) may receive the provider NHOP from the provider CPE-A2 306 to the consumer CPE-A1 304 and transmit the consumer NHOP to the provider CPE-A2 306, in the control plane in the manner described earlier. In an embodiment, the consumer NHOP is associated with at least one attribute of an NHOP. The at least one attribute of the NHOP is associated with an encryption key available with the consumer CPE-A1 304 to establish the secure communication tunnel in the data plane from the consumer CPE-A1 304 to the provider CPE-A2 306. The provider NHOP is associated with at least one attribute of the NHOP.

At step 518 the consumer CPE-A1 304 may receive the service definition, from the provider CPE-A2 306, in the control plane in the manner described earlier. At step 520, the consumer CPE-A1 304 creates the service anchor point, in the manner described earlier. At step 522, the consumer CPE-A1 304 sends a network address translation (NAT) IP request in response to the service point creation, to the provider CPE-A2 306, in the manner described earlier. At step 524, the consumer CPE-A1 304 receives the NAT IP in response to the NAT IP request using at least one identifier of the service definition, in the manner described earlier. A stateless service is instantiated on the consumer CPE-A1 304 using the NAT IP.

In accordance with the embodiments presented herein, the core nodes and/or provider/consumer CPEs may include at least a processor and a memory storage that may store one or more computer-executable instructions. The computer-executable instructions, when executed by the processor, may cause the processor to perform the steps as described with reference to FIGS. 1-5.

Thus, the embodiments of this disclosure enhance the security of the communication between enterprise networks, as explained above.

The illustrated steps are set out to explain the exemplary embodiments shown, and it should be anticipated that ongoing technological development will change the way particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step is referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. A provider customer premises equipment (CPE) in an enterprise network for secure network communication, the provider CPE comprising:
    a processor; and
    a memory storing computer-executable instructions that when executed, cause the processor to:
        transmit a provider NHOP from the provider CPE to a consumer CPE in a control plane, the provider NHOP being associated with at least one attribute of an NHOP, the at least one attribute of the NHOP being associated with an encryption key available with the provider CPE to establish a secure communication tunnel in a data plane from the provider CPE to the consumer CPE;
        transmit a service definition as a control plane information over the control plane from the provider CPE to the consumer CPE, the service definition being associated with a service available with the provider CPE;
        receive a network address translation (NAT) IP request from the consumer CPE; and
        assign, in response to the NAT IP request, a network address translation (NAT) IP to the consumer CPE using at least one identifier of the service definition, the NAT IP being associated with a service anchor point of the consumer CPE, wherein a stateless service is instantiated on the consumer CPE using the NAT IP.

2. The provider CPE of claim 1, wherein the computer-executable instructions further cause the processor to: receive a consumer NHOP from the consumer CPE in the control plane, the consumer NHOP being associated with at least one attribute of the NHOP, the at least one attribute of the NHOP being associated with an encryption key available with the consumer CPE to establish the secure communication tunnel in the data plane from the consumer CPE to the provider CPE.

3. The provider CPE of claim 1, wherein the stateless service on the consumer CPE is an extranet provider service instance of the provider CPE.

4. The provider CPE of claim 1, wherein the at least one attribute of the NHOP comprises a CPE identity, a public IP address, and a core node attachment.

5. The provider CPE of claim 1, wherein one or more identifiers of the service definition comprises a service provider name, a service provider ID, and an IP pool.

6. The provider CPE of claim 1, wherein the NAT IP is associated with a fully qualified domain name (FQDN) of a DNS-server hosted on the consumer CPE.

7. The provider CPE of claim 1, wherein the NAT IP is unique in a network address translation table.

8. A method in a provider customer premises equipment (CPE) for secure network communication, the method comprising:
    transmitting a provider NHOP, from the provider CPE to a consumer CPE in a control plane, the provider NHOP being associated with at least one attribute of an NHOP, the at least one attribute of the NHOP being associated with an encryption key, available with the provider CPE, to establish a secure communication tunnel in a data plane, from the provider CPE to the consumer CPE;
    transmitting a service definition as a control plane information over the control plane, from the provider CPE to the consumer CPE, the service definition being associated with a service, available with the provider CPE;
    receiving a network address translation (NAT) IP request, from the consumer CPE; and
    assigning, in response to the receiving, a network address translation (NAT) IP, to the consumer CPE, using at least one identifier of the service definition, wherein the NAT IP being associated with a service anchor point, of the consumer CPE, wherein a stateless service is instantiated on the consumer CPE using the NAT IP.

9. The method of claim 8 further comprising: encrypting the service definition, by the provider CPE, using an encryption key, associated with the consumer CPE, and the service definition is decrypted to configure the at least one identifier of the service definition, by the consumer CPE.

10. The method of claim 8, wherein the service definition is associated with a virtual routing and forwarding (VRF) label, a virtual private network (VPN) label, a source internet protocol (IP) address, and a destination IP address.

11. A consumer customer premises equipment (CPE) in an enterprise network for secure network communication, the consumer CPE comprising:
    a processor; and
    a memory storing computer-executable instructions that when executed, cause the processor to:
        transmit a consumer NHOP to a provider CPE, in a control plane, the consumer NHOP being associated with at least one attribute of an NHOP, the at least one attribute of the NHOP being associated with an encryption key available with the consumer CPE to establish a secure communication tunnel in a data plane from the consumer CPE to the provider CPE;
        receive a service definition as a control plane information over the control plane from the provider CPE, the service definition being associated with a service available with the provider CPE;
        create a service anchor point based on at least one identifier of the service definition;
        transmit a network address translation (NAT) IP request to the provider CPE in response to creation of the service anchor point; and
        receive a network address translation (NAT) IP, in response to the NAT IP request, from the provider CPE using the at least one identifier of the service definition, the NAT IP being associated with the service anchor point of the consumer CPE, wherein a stateless service is instantiated on the consumer CPE using the NAT IP.

12. The consumer CPE of claim 11, wherein the computer-executable instructions further cause the processor to: receive a provider NHOP from the provider CPE to the consumer CPE, in the control plane, the provider NHOP being associated with at least one attribute of the NHOP, wherein the at least one attribute of the NHOP available with the provider CPE being associated with an encryption key to establish the secure communication tunnel in the data plane to the consumer CPE from the provider CPE.

13. The consumer CPE of claim 11, wherein the stateless service on the consumer CPE is an extranet provider service instance of the provider CPE.

14. The consumer CPE of claim 11, wherein the at least one attribute of the NHOP comprises one or more of a CPE identity, a public IP address, and a core node attachment.

15. The consumer CPE of claim 11, wherein one or more identifiers of the service definition comprises a service provider name, a service provider ID, and an IP pool.

16. The consumer CPE of claim 11, wherein the NAT IP being associated to a fully qualified domain name (FQDN) of a DNS-server hosted on the consumer CPE.

17. The consumer CPE of claim 11, wherein the NAT IP is unique in a network address translation table.

18. A method in a consumer customer premises equipment (CPE) for secure network communication, the method comprising:
  transmitting a consumer NHOP, to a provider CPE from the consumer CPE, in a control plane, the consumer NHOP being associated with at least one attribute of an NHOP, the at least one attribute of the NHOP being associated with an encryption key, available with the consumer CPE, to establish a secure communication tunnel in a data plane, from the consumer CPE to the provider CPE;
  receiving a service definition as a control plane information over the control plane, from the provider CPE to the consumer CPE, the service definition being associated with a service, available with the provider CPE;
  creating a service anchor point based on at least one identifier of the service definition;
  transmitting a network address translation (NAT) IP request in response to creation of the service anchor point, to the provider CPE; and
  receiving a network address translation (NAT) IP, in response to the NAT IP request, using the at least one identifier of the service definition, from the provider CPE, wherein the NAT IP being associated with the service anchor point, of the consumer CPE, wherein a stateless service is instantiated on the consumer CPE using the NAT IP.

19. The method of claim 18, wherein the method further comprising: encrypting the service definition, by the provider CPE, using an encryption key, associated with the consumer CPE, and the service definition is decrypted to configure the at least one identifier of the service definition, by the consumer CPE.

20. The method of claim 18, wherein the service definition is associated with a virtual routing and forwarding (VRF) label, a virtual private network (VPN) label, a source internet protocol (IP) address, and a destination IP address.

* * * * *